United States Patent [19]

Caldwell

[11] Patent Number: 4,626,068
[45] Date of Patent: Dec. 2, 1986

[54] PHOTOACTIVE COATING FOR HARDENING OPTICAL FIBERS

[75] Inventor: Robert S. Caldwell, Seattle, Wash.

[73] Assignee: The United States of America as represented by the Secretary of the Air Force, Washington, D.C.

[21] Appl. No.: 403,215

[22] Filed: Jul. 29, 1982

[51] Int. Cl.$^4$ .......................... G02B 6/00; B05B 5/00; C09K 11/54

[52] U.S. Cl. .............................. 350/96.34; 350/96.10; 350/96.30; 350/96.33; 427/157; 250/458.1; 250/483.1; 250/484.1; 252/301.4 R; 252/301.6 R; 252/600

[58] Field of Search ............... 427/157, 158; 252/582, 252/301.16, 301.17, 301.18, 301.4 R, 401.4 S, 301.6 S, 600; 350/96.29, 96.30, 96.31, 96.33, 96.34, 96.10, 96.15; 250/483.1, 486.1, 227, 458.1; 372/80, 33, 40, 6

[56] References Cited

U.S. PATENT DOCUMENTS

| | | | |
|---|---|---|---|
| 2,825,260 | 3/1958 | O'Brien | 88/1 |
| 3,369,125 | 2/1968 | Dueker | 250/213 |
| 3,470,490 | 9/1969 | Held et al. | 372/80 |
| 3,571,737 | 3/1971 | Miller | 330/4.3 |
| 3,611,179 | 10/1971 | Fyler | 372/80 X |
| 3,611,188 | 10/1971 | Snitzer | 372/40 |
| 4,075,493 | 2/1978 | Wickersheim | 250/461 R |
| 4,111,525 | 9/1978 | Kaminow et al. | 350/96.31 |
| 4,165,915 | 8/1979 | Rau et al. | 350/96.34 |
| 4,167,305 | 9/1979 | Ichiba et al. | 350/96.34 |
| 4,173,393 | 11/1979 | Maurer | 350/96.34 |
| 4,243,299 | 1/1981 | Gliemeroth et al. | 350/96.34 |
| 4,407,561 | 10/1983 | Wysocki et al. | 350/96.33 |
| 4,415,810 | 11/1983 | Brown, Sr. | 250/486.1 |
| 4,418,984 | 12/1983 | Wysocki et al. | 350/96.33 |

FOREIGN PATENT DOCUMENTS 54-121787  9/1979  Japan .................. 350/96.15

OTHER PUBLICATIONS

Hardwick et al., "Effects of Low Dose Radiation on Opto-Electronic ..." IEEE Trans. on Nuclear Science vol. NS-26, No. 6 12/79 pp. 4808-4813.

Jueneman, "Diffusing Mirror-Total Internal Reflection Illuminator" I.B.M. Tech. Disc. Bull. vol. 8, No. 1 6/65 pp. 106-107.

Friebele et al., "Effect of Ionizing Radiation on ... Fiber-Optic Waveguides" Appl. Phys. Lett. pp. 619-621, vol. 32, No. 10 5/78.

Edahiro et al., "Phosphor-Doped Silica Cladding V.A.D. Fibres", Elect. Lett. vol. 15, No. 22 10/79 pp. 726-728.

Friebele et al., "Radiation Damage of Optical Fiber ..." Applied Optics vol. 21, No. 3 2/82 pp. 547-553.

Rosie Wicz et al., "Effects of Radiation on Doped Silica Core, Optical Fibres", Elect. Lett. 11/80 vol. 16. No. 23 pp. 866-867.

West et al., "Characteristics of Light Induced Annealing in Irradiated Optical Fibres", Elect. Lett. 5/82 vol. 18, No. 11 pp. 483-484.

Buzhinskii et al., "Phosphate Glasses for Manufacturing a Glass Fiber ..." Sov. J. of Opt. Tech. vol. 44, No. 10, 10/77 pp. 609-610.

Ohmori et al., "Very Low OH Content $P_2O_5$-Doped Silica Fibres" Elect. Lett. vol. 15, No. 20 9/79, pp. 616-618.

Friebele et al., "Composition Effects on the Radiation Response of ... Optical Fiber Waveguides" Appl. Opt. vol. 19, No. 17 9/80, pp. 2910-2916.

Friebele et al., "Photobleaching Effects in Optical Fiber Waveguides" Applied Optics vol. 20, No. 19, 10/81 pp. 3448-3452.

Growth of Single Crystal Sapphire-Clad Ruby Fibers, Burrus et al., Appl. Phys. Lett. vol. 31, No. 6, 9/15/77.

"Effects of Ionizing Radiation on Transmission of Optical Fibers", G. H. Sigel, Jr. and B. D. Evans, Applied Physics Letters 24, No. 9: p. 410 (May 1974).

Primary Examiner—William L. Sikes
Assistant Examiner—Brian M. Healy
Attorney, Agent, or Firm—Bobby D. Scearce; Donald J. Singer

[57] ABSTRACT

An improved optical fiber structure is provided which is hardened against the effects of ionizing nuclear radiation and comprises a conventional plastic, glass or silica optical fiber core and cladding, having an additional outer coating comprising phosphorescent or luminescent material for interacting with the ionizing radiation to provide a source of light to optically bleach the fiber core of optical absorption sites produced as a result of the interaction of the ionizing radiation with the fiber core material.

4 Claims, 1 Drawing Figure

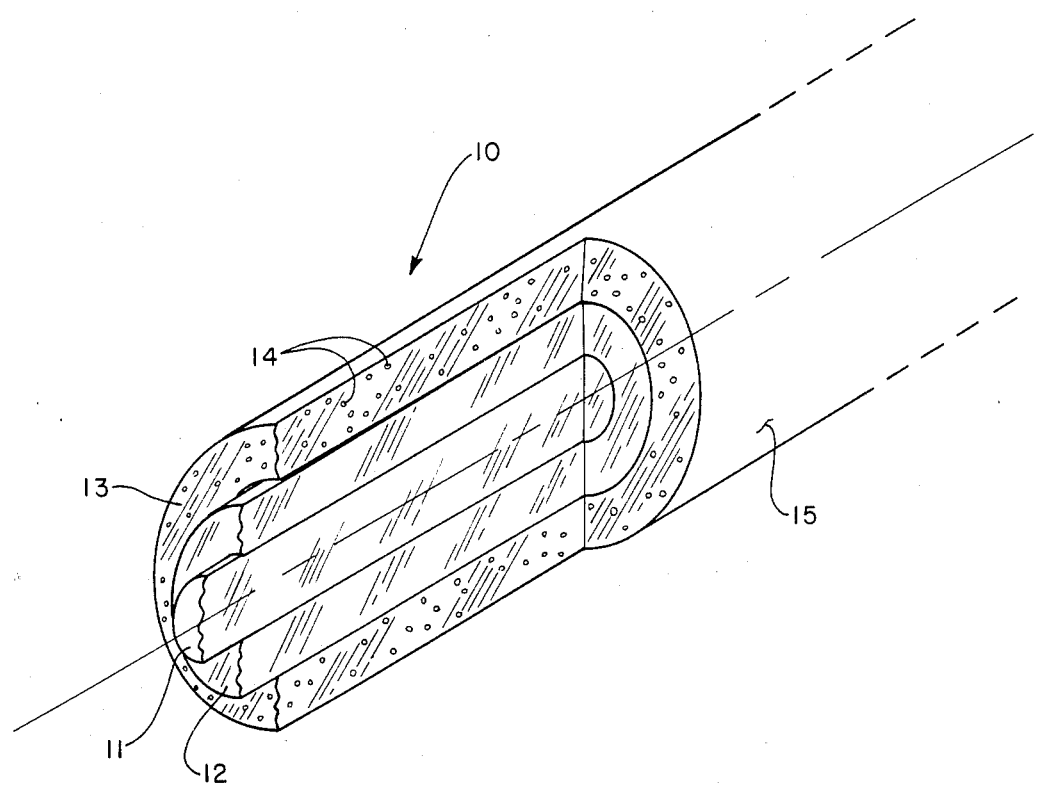

PHOTOACTIVE COATING FOR HARDENING OPTICAL FIBERS

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of optical fibers and more specifically to optical fibers which are hardened against the deteriorating effects of ionizing radiation on the optical transmissibility of the fiber.

Optical fibers finding substantial commercial use as optical data links in communication systems must necessarily be characterized by relatively low losses in optical transmissibility along the length of the fiber. To this end, considerable prior work has been done in the development of optical fibers having desirable combinations of refractive indices for the core and cladding characterized by transmission losses of less than 1 dB/m. The use of optical fibers as data links in certain environments, such as satellite systems, weapons or other military related equipment, certain medical diagnostic instrumentation, geological survey equipment, and the like may subject the fiber to the influence of ionizing nuclear radiation. Exposure to the ionizing radiation may temporarily or permanently disable the fiber optic core depending upon the radiation type, intensity and exposure time affecting the fiber optic core. Disablement of the core by the ionizing radiation is associated with the interaction of the radiation with impurities in the core material, certain of which impurities may be included to achieve the desirable refractive index for the core material. The interaction of the radiation with the impurities generates optical absorption sites which characteristically interfere with the transmissibility of the optical fiber. Substantial reduction of transmissibility may result under the influence of the ionizing radiation, although characteristically the core material may slowly recover some degree of transmissibility upon removal of the radiation. Shielding the fiber optics from the radiation using conventional materials is inappropriate in most cases because of the mass of material required for effective shielding.

Previous attempts to reduce the effects of the interaction of the optical fiber core with radiation have concentrated upon removing impurities from the core material or upon adding specific impurities to the core material to reduce the effectiveness of the optical absorption sites most affected by the radiation.

These troublesome optical absorption sites have been found to be susceptible to removal by optically exciting them with light of the proper wavelengths, usually either in the visible or in the ultraviolet range. The process of optically bleaching out the radiation affected absorption sites by light injection at a fiber end will not be effective for long fibers because the bleaching process is time dependent and occurs slowly enough that any desirable degree of bleaching down the fiber optic length is unacceptably delayed. Furthermore, most fibers inherently exhibit a higher degree of absorption at the shorter ultraviolet wavelengths which could be most effective for bleaching, than at the longer, near infrared, wavelengths, normally used for signal transmission, which further complicates the problem of bleaching the fiber core along its length.

The invention described herein provides a novel optical fiber configuration comprising a conventional optical fiber core, with a conventional cladding, which has an additional outer coating of phosphorescent or luminescent material, or a coating or sheath of a transparent material within which a suitable phosphor material is distributed. This outer coating or sheath material should have a refractive index equal to or less than the index of the cladding material. Upon exposure of the optical fiber structure of the present invention to ionizing radiation, the phosphor material will be stimulated by interaction with the radiation to emit light of a desirable ultraviolet or visible wavelength to bleach radiation-induced optical absorption centers in the core. The presence of the phosphor in the coating in close proximity to the fiber optic core and cladding layer along its entire length therefore provides a source of ultraviolet or visible light to bleach the core continuously during the exposure of the fiber to the radiation and during the short time immediately following the irradiation during which the phosphor continues to emit bleaching light with a characteristic decay time. An outer metallic coating may be applied to the structure to enhance internal reflections of the phosphorescent light.

It is therefore an object of this invention to provide an improved optical fiber data link.

It is a further object of this invention to provide an optical fiber which is partially hardened against the effects of ionizing nuclear radiation.

These and other objects of the present invention will become apparent as the detailed description of certain representative embodiments thereof proceeds.

SUMMARY OF THE INVENTION

In accordance with the foregoing principles and objects of the present invention, an improved optical fiber structure is provided which is hardened against the effects of ionizing nuclear radiation and comprises a conventional plastic, glass or silica optical fiber core and cladding, having an additional outer coating comprising phosphorescent or luminescent material for interacting with the ionizing radiation to provide a source of light to optically bleach the fiber core of optical absorption sites produced as a result of the interaction of the ionizing radiation with the fiber core material.

DESCRIPTION OF THE DRAWINGS

The present invention will be more clearly understood from the following detailed description of certain representative embodiments thereof read in conjunction with the accompanying drawing which is an enlarged scale isometric view, partially in section, of a segment of optical fiber having the novel radiation hardened coating of the present invention applied thereon.

DETAILED DESCRIPTION

Referring now to the accompanying drawing, the novel optical fiber structure 10 of the present invention may include a conventional optical fiber core 11 of any typical silica, glass, or plastic composition conventionally used for a light-conducting fiber core. A cladding 12 may be disposed around the core in the manner shown schematically in the drawing and may comprise a suitable transparent silica, glass, or plastic material having a desirable index of refraction to define an optical waveguide in cooperation with core 11. Ordinarily, cladding 12 will comprise a material having a lower refractive index than that of the material comprising core 11. The core-cladding interface may be a distinct step-index junction or it may be a radially-graded index junction similar to any of the various conventional constructions presently used for fiber optics. The core 11-cladding 12 structure may be produced by any of the well known methods, such as drawing, conventionally used in the art for producing optical fibers.

To the outer surface of the fiber optic core 11 and cladding 12 is applied the novel coating 13 of the present invention comprising a phosphorescent or luminescent material. Coating 13 may be in the form of a sheath applied to the outer surface of the cladding by conventional means such as by drawing, and may be of any desirable thickness consistent with size or weight limitations placed on the fiber assembly 10. Coating 13 may preferably comprise a suitable transparent material, such as clear plastic or glass, having distributed therethrough suitable phosphorescent or luminescent material such as depicted in the drawing as phosphor 14. Alternatively, coating 13 may comprise a clear lacquer or the like containing phosphor 14 applied conventionally to cladding 12. Coating 13 should preferably have a refractive index equal to or less than the index of the cladding material 12. Suitable high intensity phosphors 14 which emit radiation in the desirable wavelengths upon interaction with ionizing nuclear radiation and which may be appropriate for use herein include silver-doped zinc sulfide, manganese-doped magnesium silicate, and chromium-oxide-doped ruby. Many other phosphorescent or luminescent materials may be used as might occur to one with skill in the applicable art, and, therefore, it is understood that the named materials shall not be limiting of the present invention. Additionally, two or more optical fiber waveguides may be enclosed in one all encompassing photoactive coating if desired.

Upon exposure of the optical fiber structure depicted in the drawings to an environment of ionizing nuclear radiation, the phosphor 14 will be excited to emit characteristic radiation in the ultraviolet or visible range along the entire fiber length affected by the ionizing radiation. Any optical absorption sites within the fiber core 11 produced by the interaction of the core material with the radiation are concurrently subjected to a nearby source of optically bleaching radiation, which substantially immediately or within a short time thereafter partially counteracts the effect of the radiation and partially restores the transmissibility of the core 11 material. The geometry of the novel structure 10 depicted in the drawing precludes any saturation of the optical detector at the end of the fiber core with light emitted from the excited phosphor 14 either during radiation or following the removal of the radiation since the light emitted by phosphor 14 is not injected into the fiber core 11 at an angle appropriate for propagation along the core.

To the outer surface of coating 13 may desirably be applied a thin metallic layer 15 to provide a high degree of internal reflections of the phosphorescent light, and, additionally, to increase the total light available for bleaching the fiber core. Layer 15 may comprise any suitable material to provide desirable internal reflectivity, and may include aluminum, silver, gold, rhodium, or the like applied conventionally.

The present invention, as hereinabove described, therefore provides an improved optical fiber including a photoactive coating for hardening the fiber core against the deteriorating effects of ionizing nuclear radiation. The invention herein contributes substantially to the survivability and/or quick recovery of an optical data link in an environment of ionizing nuclear radiation. It is understood that certain modifications to the invention as hereinabove described may be made, as might occur to one with skill in the field of this invention, within the intended scope hereof. Therefore, all embodiments contemplated hereunder and asserted to be within the scope of the appended claims have not been shown in complete detail. Other embodiments may be developed without departing from the spirit of this invention or from the scope of the appended claims.

I claim:

1. An optical fiber structure which is hardened against the effects of ionizing nuclear radiation emanating from a source external of said fiber structure, which comprises:
   a. a light conducting core comprising a material having a first predetermined index of refraction;
   b. a transparent cladding on said core, said cladding comprising a material having a second predetermined index of refraction less than said first predetermined index of refraction;
   c. a substantially transparent coating on said cladding, said coating including a phosphorescent material substantially uniformly distributed throughout said coating for interacting with said ionizing radiation to emit light to irradiate that portion of said core near said light emitting phosphorescent material affected by said radiation; and
   d. a metallized layer on said coating, said metallized layer including an internally reflective surface for reflecting said light into said core.

2. The optical fiber as recited in claim 1 wherein said phosphorescent material is selected from the group consisting of silver-doped zinc sulfide, manganese-doped magnesium silicate, and chromium-oxide-doped ruby.

3. The optical fiber as recited in claim 1 wherein said coating comprises a transparent material selected from the group consisting of plastic, glass, and silica.

4. The optical fiber as recited in claim 1 wherein said metallized layer comprises a material selected from the group consisting of aluminum, silver, gold, and rhodium.

* * * * *